United States Patent
Shin et al.

(10) Patent No.: US 10,444,999 B2
(45) Date of Patent: Oct. 15, 2019

(54) UNIVERSAL FLASH STORAGE (UFS) HOST DESIGN FOR SUPPORTING EMBEDDED UFS AND UFS CARD

(71) Applicant: QUALCOMM Incorporated, San Diego, CA (US)

(72) Inventors: Hyunsuk Shin, San Diego, CA (US); David Teb, Haifa (IL); Hung Vuong, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 15/292,675

(22) Filed: Oct. 13, 2016

(65) Prior Publication Data
US 2018/0107384 A1 Apr. 19, 2018

(51) Int. Cl.
*G06F 3/06* (2006.01)
*G06F 13/40* (2006.01)

(52) U.S. Cl.
CPC ............ *G06F 3/061* (2013.01); *G06F 3/0607* (2013.01); *G06F 3/0635* (2013.01); *G06F 3/0679* (2013.01); *G06F 13/4022* (2013.01)

(58) Field of Classification Search
CPC .............................. G06F 3/061; G06F 3/0607
USPC .................................. 710/307, 313, 38, 316
See application file for complete search history.

(56) References Cited

U.S. PATENT DOCUMENTS

| | | | |
|---|---|---|---|
| 8,856,401 B2 * | 10/2014 | Azadet ............... | G06F 13/4022 370/465 |
| 2013/0019053 A1 | 1/2013 | Somanache et al. | |
| 2013/0073795 A1 | 3/2013 | Hasegawa | |
| 2014/0119463 A1 | 5/2014 | Masse et al. | |
| 2014/0244904 A1 | 8/2014 | Kondo et al. | |
| 2015/0113333 A1 * | 4/2015 | Kim ......................... | G06F 1/32 714/43 |

(Continued)

FOREIGN PATENT DOCUMENTS

WO 2014171937 A1 10/2014

OTHER PUBLICATIONS

ARASAN: "Universal Flash Storage: Mobilize Your Data", Arasan Chip Systems, Inc Oct. 2012, pp. 1-8.
(Continued)

*Primary Examiner* — Farley Abad
*Assistant Examiner* — Henry W Yu
(74) *Attorney, Agent, or Firm* — Muncy, Geissler, Olds & Lowe, P.C.

(57) ABSTRACT

Systems and method are directed to a Universal Flash Storage (UFS) host capable of interfacing one or more UFS devices. The UFS host includes a plurality of mobile-physical-layers (M-PHYs) for supporting one or more lanes of traffic between the UFS host and the one or more UFS devices. A Reference M-PHY MODULE Interface (RMMI) router is coupled between a Unified Protocol link layer (Unipro) and the plurality of M-PHYs. The RMMI router is configurable in a transparent mode to pass traffic, without routing, between the UFS host and a 2-lane embedded UFS device through the two M-PHYs. The RMMI router is configurable in a routing mode, to route traffic to a first M-PHY interfacing a 1-lane embedded UFS device or to a second M-PHY interfacing a 1-lane removable UFS card. The RMMI router is configurable based on metal strap or read only memory (ROM) setting.

30 Claims, 10 Drawing Sheets

(56) References Cited

U.S. PATENT DOCUMENTS

| | | |
|---|---|---|
| 2015/0205339 A1* | 7/2015 | Park .................... G06F 1/3278 |
| | | 713/323 |
| 2016/0004634 A1 | 1/2016 | Kim |
| 2016/0011790 A1 | 1/2016 | Rostoker et al. |
| 2016/0034413 A1 | 2/2016 | Park |
| 2016/0077994 A1* | 3/2016 | Hamada ............. G06F 13/4282 |
| | | 710/313 |
| 2016/0267016 A1 | 9/2016 | Lee et al. |
| 2016/0274821 A1* | 9/2016 | Park .................... G06F 13/102 |
| 2016/0283434 A1* | 9/2016 | Ranganathan ...... G06F 13/4291 |
| 2017/0176534 A1 | 6/2017 | Chellappan et al. |

OTHER PUBLICATIONS

Saar H., et al., "JEDEC UFS Streamlines Storage Interface Development", Embedded Content from Electronic Design, Jul. 14, 2016, pp. 1-9.
International Search Report and Written Opinion—PCT/US2017/048590—ISA/EPO—dated Nov. 9, 2017.

* cited by examiner

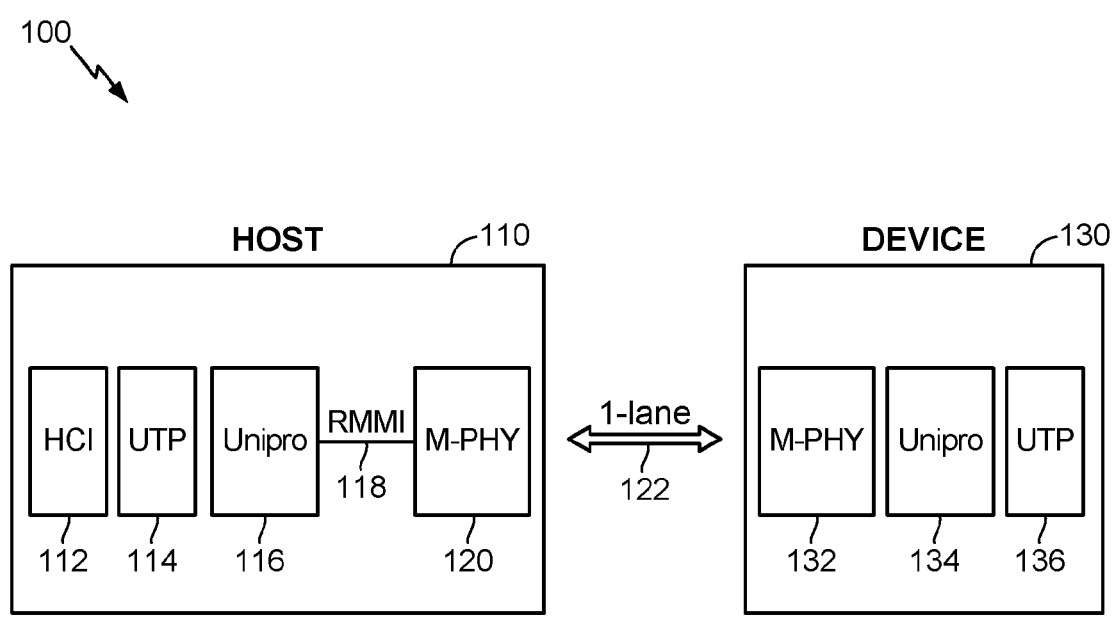
CONVENTIONAL
FIG. 1

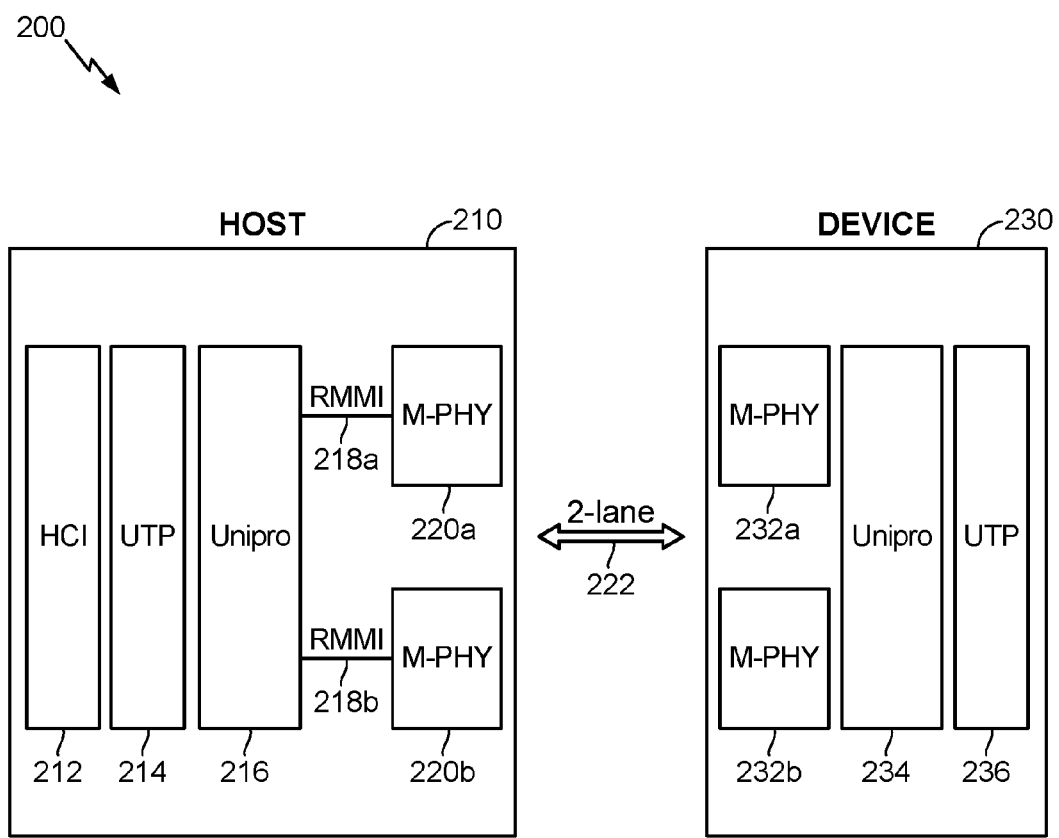
CONVENTIONAL
FIG. 2

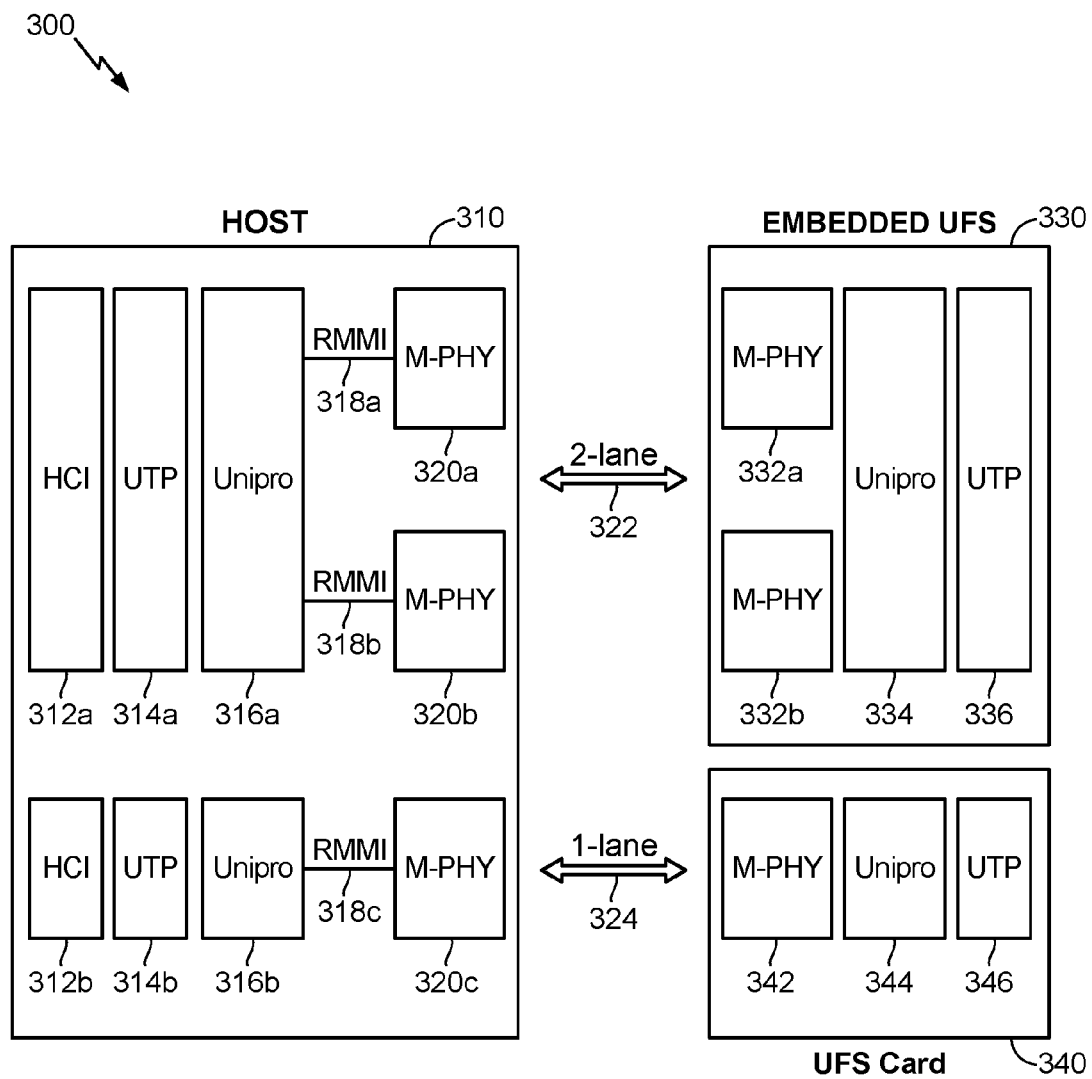
CONVENTIONAL
FIG. 3

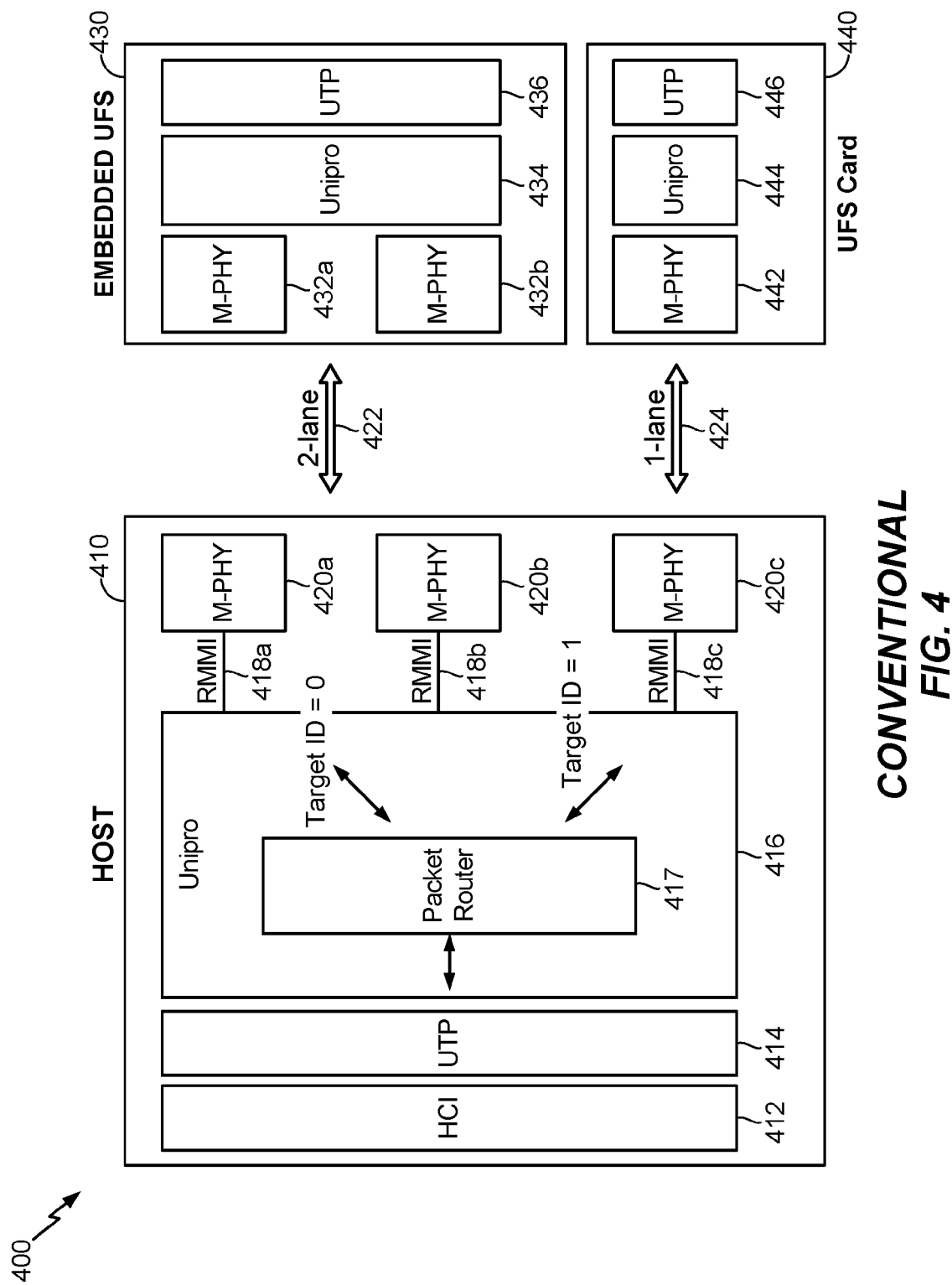
CONVENTIONAL
FIG. 4

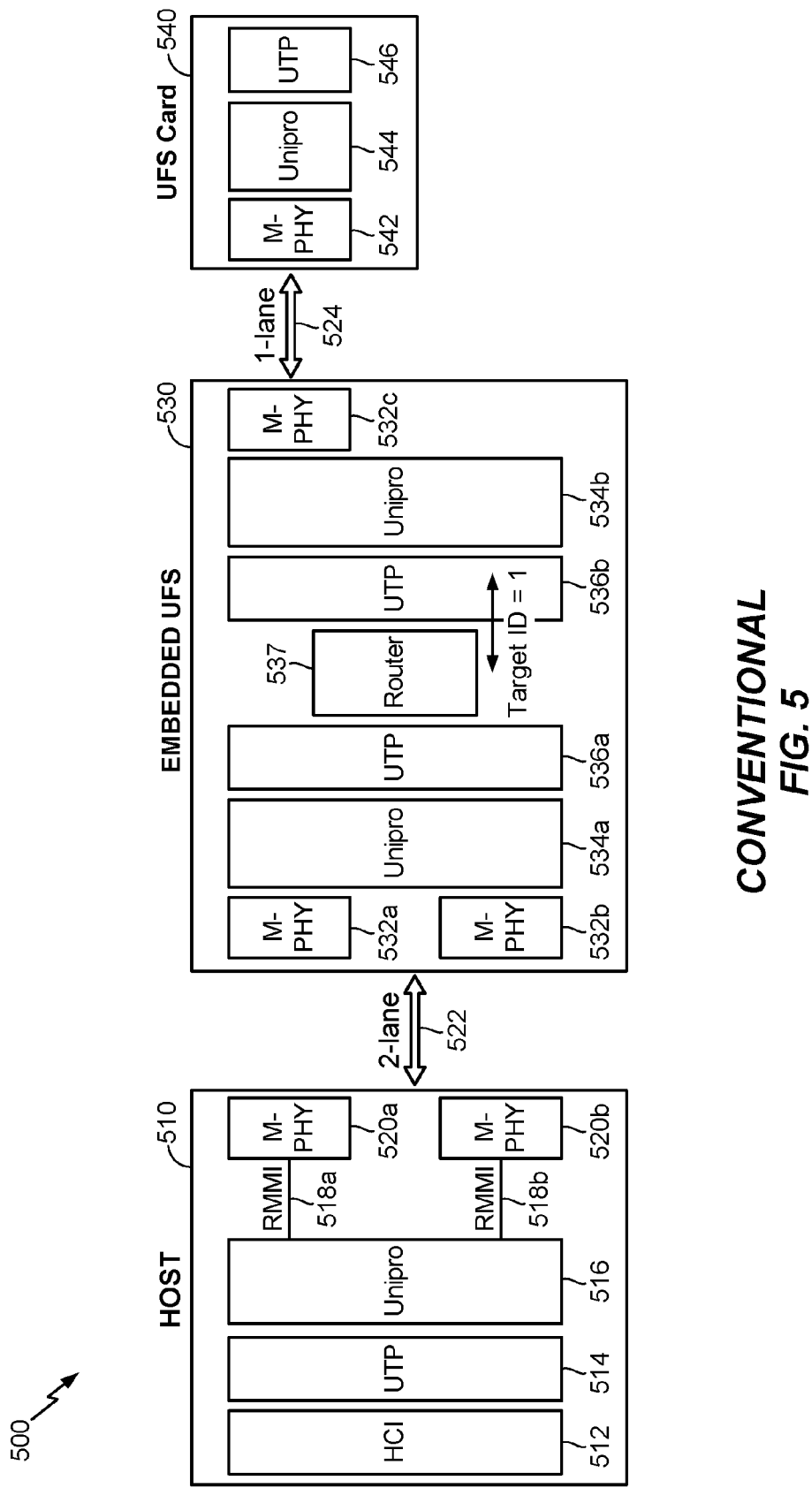
CONVENTIONAL
FIG. 5

UNIVERSAL FLASH STORAGE (UFS) HOST DESIGN FOR SUPPORTING EMBEDDED UFS AND UFS CARD

FIELD OF DISCLOSURE

Disclosed aspects are directed to Flash memory systems. More particularly, exemplary aspects are directed to designs for Universal Flash Storage (UFS) hosts which can support different UFS devices such as embedded Universal Flash Storage (UFS) and removable UFS cards with different lane requirements.

BACKGROUND

Universal Flash Storage (UFS) is a Flash memory system defined by the Joint Electron Device Engineering Council (JEDEC) standard, designed for high data transfer speed and low power consumption. Correspondingly, UFS is well-suited for mobile applications (e.g., mobile phones, laptop computers, handheld devices, tablets, etc.) where high performance demands are seen in conjunction with low power consumption requirements. A UFS memory system may be an embedded device within a host such as a processor or system on chip (SoC), or may be integrated on a removable card, for flexible use with different hosts. Different standards and configurations may be applicable to the available UFS memory systems.

For example, UFS memory systems as well as their interfaces to the hosts may include multiple layers to support the standards. The host may include a Host Controller Interface (HCI) and a UFS Transport Protocol (UTP) as defined in the JEDEC standard, as well as a Unified Protocol (Unipro) and a physical interface referred to as M-PHY as defined by the Mobile Industry Processor Interface (MIPI) alliance. Within the host, the Unipro and the M-PHY are designed to communicate through an interface or bus referred to as a Reference M-PHY MODULE Interface (RMMI), which is also defined in the MIPI standard.

The UFS memory system which communicates with the host may also include counterpart layers, UTP, Unipro, and M-PHY. Each M-PHY supports a specific number of bits or pins, referred to in units of lanes. Depending on particular implementations, a UFS device may support one or more lanes. An embedded UFS is usually a single lane device, but there is an increasing demand in the art for embedded UFS devices which support two lanes. A UFS card is typically a removable device, and supports a single lane of memory traffic.

In conventional implementations, a host which is configured to support UFS devices of different lanes (e.g., a 2-lane embedded UFS and a 1-lane UFS card) is integrated with dedicated hardware support for the different lanes of the UFS devices which are supported. Thus, in a conventional implementation, there is a lack of efficient sharing of hardware/logic on the host, and correspondingly, conventional implementations suffer from duplication of hardware and accompanying higher costs.

Accordingly, there is a corresponding need in the art for reducing costs and promoting efficient sharing and utilization of hardware to support the different types of UFS memory systems which may have different hardware including different number of lanes.

SUMMARY

Exemplary aspects of the invention include systems and methods directed to a Universal Flash Storage (UFS) host capable of interfacing one or more UFS devices. The UFS host includes a plurality of mobile-physical-layers (M-PHYs) for supporting one or more lanes of traffic between the UFS host and the one or more UFS devices. A Reference M-PHY MODULE Interface (RMMI) router is coupled between a Unified Protocol link layer (Unipro) and the plurality of M-PHYs. The RMMI router is configurable in a transparent mode to pass traffic, without routing, between the UFS host and a 2-lane embedded UFS device through the two M-PHYs. The RMMI router is configurable in a routing mode, to route traffic to a first M-PHY interfacing a 1-lane embedded UFS device or to a second M-PHY interfacing a 1-lane removable UFS card. The RMMI router is configurable based on metal strap or read only memory (ROM) setting.

For example, an exemplary aspect is directed to a apparatus comprising a Universal Flash Storage (UFS) host configured to interface one or more UFS devices. The UFS host comprises a plurality of mobile-physical-layers (M-PHYs) configured to support one or more lanes of traffic between the UFS host and the one or more UFS devices. A Reference M-PHY MODULE Interface (RMMI) router is coupled between a Unified Protocol link layer (Unipro) and the plurality of M-PHYs, wherein the RMMI router is configured to support at least a transparent mode, wherein traffic is passed without routing to the plurality of M-PHYs, and a routing mode, wherein traffic is routed to a subset of the M-PHYs Another exemplary aspect is directed to a method of operating a Universal Flash Storage (UFS) host, the method comprising configuring a Reference M-PHY MODULE Interface (RMMI) router between a Unified Protocol link layer (Unipro) and a plurality of M-PHYs in one of at least two modes. In a transparent mode, the RMMI router passes traffic without routing to the plurality of M-PHYs, and in a routing mode, the RMMI router routes traffic to a subset of the M-PHYs. The UFS host is interfaced to one or more UFS devices based on the transparent mode or the routing mode.

Yet another exemplary aspect is directed to a non-transitory computer readable storage medium comprising code, which, when executed by a processor, causes the processor to operate a Universal Flash Storage (UFS) host, the non-transitory computer readable storage medium comprising code for configuring a Reference M-PHY MODULE Interface (RMMI) router between a Unified Protocol link layer (Unipro) and a plurality of M-PHYs in one of at least two modes comprising, code for passing traffic without routing to the plurality of M-PHYs in a transparent mode, and code for routing traffic to a subset of the M-PHYs in a routing mode. The non-transitory computer readable storage medium further comprises code for interfacing the UFS host to one or more UFS devices based on the transparent mode or the routing mode.

Another exemplary aspect is directed to an apparatus comprising a Universal Flash Storage (UFS) host, means for configuring a Reference M-PHY MODULE Interface (RMMI) router between a Unified Protocol link layer (Unipro) and a plurality of M-PHYs in one of at least two modes. The apparatus includes means for passing traffic without routing to the plurality of M-PHYs in a transparent mode, and means for routing traffic to a subset of the M-PHYs in a routing mode. The apparatus also includes means for interfacing the UFS host to one or more UFS devices based on the transparent mode or the routing mode.

BRIEF DESCRIPTION OF THE DRAWINGS

The accompanying drawings are presented to aid in the description of aspects of the invention and are provided solely for illustration of the aspects and not limitation thereof.

FIG. 1 illustrates a conventional system with a UFS host interfacing a 1-lane UFS device.

FIG. 2 illustrates a conventional system with a UFS host interfacing a 2-lane UFS device.

FIG. 3 illustrates a conventional system with a UFS host interfacing a 1-lane UFS device and a 2-lane UFS device.

FIG. 4 illustrates a conventional system with a UFS host interfacing a 1-lane UFS device and a 2-lane UFS device.

FIG. 5 illustrates a conventional system with a UFS host interfacing a 1-lane UFS device and a 2-lane UFS device.

DETAILED DESCRIPTION

Figure 6:
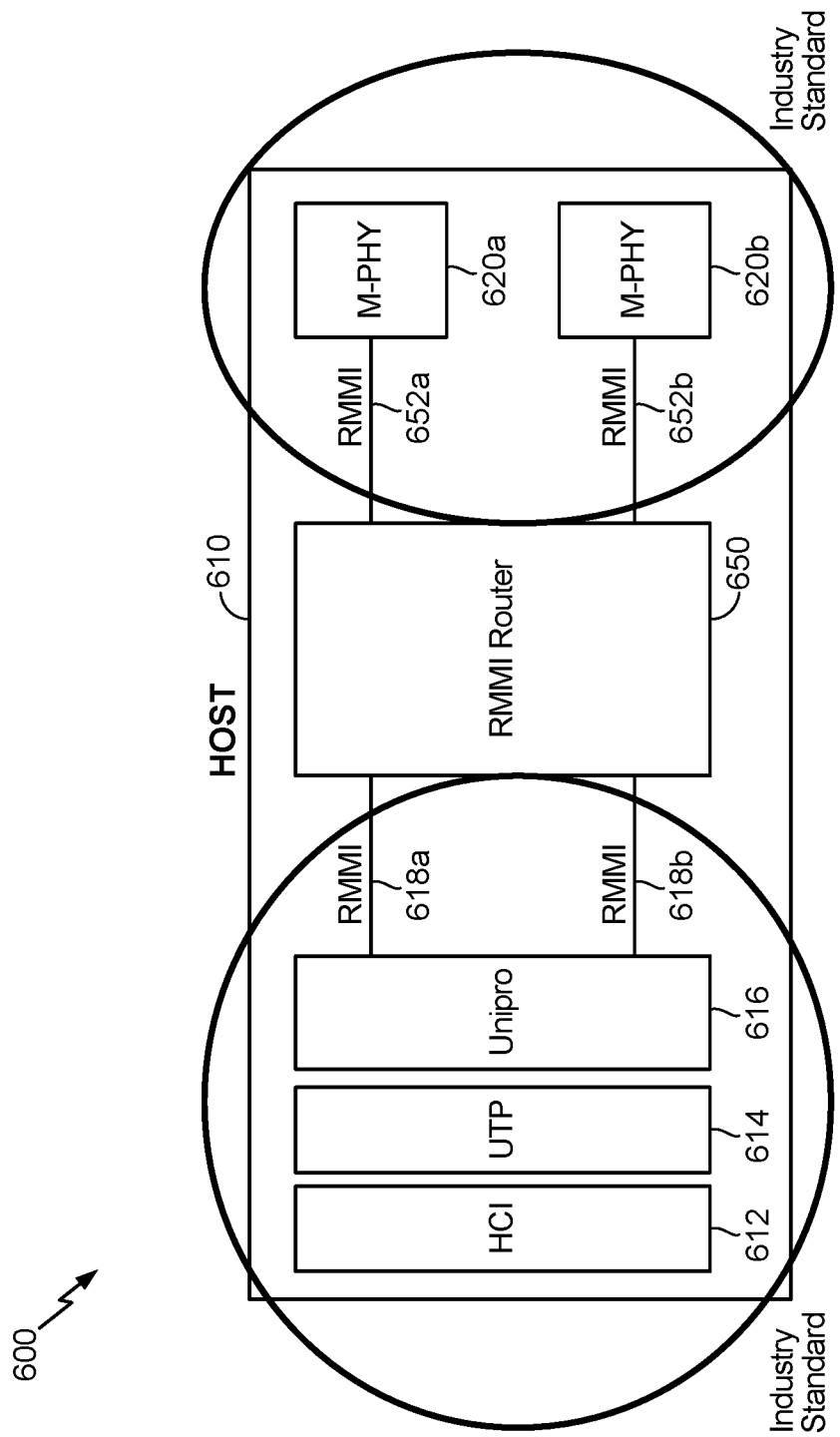
FIG. 6 illustrates an exemplary system with a UFS host designed to support UFS devices with different lane requirements, according to aspects of this disclosure.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure are directed to host devices configured to support both embedded Universal Flash Storage (UFS), as well as removable UFS cards, with efficient sharing of logic among the multiple layers defined in the JEDEC and MIPI standards. Existing designs for Unipro and M-PHY layers as defined in the standards may be used, in conjunction with an exemplary RMMI router which can be dynamically configured and to support different modes including a first mode, referred to as a transparent mode, and a second mode, referred to as a routing mode.

In one implementation where the host includes two M-PHYs to support up to 2-lanes, in the transparent mode a 2-lane embedded UFS may be supported by the host, wherein the RMMI router may pass packets from the Unipro to the two M-PHYs, as in the case of standard host designs for supporting 2-lane embedded UFS. In the routing mode, an exemplary UTP on the host may be configured to specify to the RMMI router, the target identification (ID) of the UFS device, and depending on whether the target device is a 1-lane embedded UFS or a 1-lane removable UFS card, the RMMI router may correspondingly route the packets. These and other exemplary features will be discussed with reference to the figures in the following sections.

With reference first to FIG. 1, a conventional system 100 comprising host 110 and UFS device 130 will first be discussed. Host 110 may be any processor, core, SoC, etc., which may be designed according to the JEDEC and MIPI standards to support and access Flash memory stored in UFS device 130. UFS device 130 may be a single lane UFS device, and as such, either a 1-lane embedded UFS or a 1-lane removable UFS. Accordingly, host 110 may support a single lane connection 122 between host 110 and UFS device 130. For this, host 110 includes Unipro 116 and M-PHY 120 (as defined in the MIPI standard) to support a single lane, with RMMI 118 coupled between Unipro 116 and M-PHY 120. Host 110 also includes HCI 112 and UTP 114 designed according to the JEDEC standard. Correspondingly, UFS device 130 includes M-PHY 132, Unipro 134, and UTP 136 to support the single lane connection 122 to host 110. To support additional lanes, additional M-PHYs may be added to the host and to the UFS device.

For example, as shown in FIG. 2, conventional system 200 is shown with host 210 and UFS device 230 configured for two lane support. Specifically, in this case, host 210 includes HCI 212, UTP 214, and Unipro 216 designed to support two lanes, along with corresponding two RMMIs 218a-b coupled to two M-PHYs 220a-b. Each RMMI and M-PHY on host 210 is designed to support one lane. Thus, 2-lane connection 222 is provided between host 210 and UFS device 230, wherein, UFS device 230 is also designed with two M-PHYs 232a-b, and Unipro 234, UTP 236 designed to support two lanes. As such UFS device 230 may be an embedded 2-lane UFS. However, conventional system 200 may not be able to flexibly also support a 1-lane UFS such as a 1-lane removable UFS card.

Accordingly, with reference to FIG. 3, conventional system 300 designed to support both a 2-lane UFS device as well as a 1-lane UFS device is shown. System 300 may include a combination of hardware discussed in reference to FIGS. 1-2. Specifically, host 310 may include HCI 312a, UTP 314a, Unipro 316a connected to two M-PHYs 320a-b through two RMMIs 318a-b, and 2-lane connection 322 to 2-lane embedded UFS 330 comprising two M-PHYs 332-b, Unipro 334, and UTP 336 to support a 2-lane UFS device (similar to the design of system 200 of FIG. 2). Further, host 310 may also include HCI 312b, UTP 314b, Unipro 316b connected to M-PHY 320c through RMMI 318c, and '-lane connection 324 to 1-lane UFS card 340 comprising M-PHY 342, Unipro 344, and UTP 346 to support a single lane UFS device (similar to the design of system 100 of FIG. 1). As such, it is seen that in host 310, the logic to support the 2-lane connection 322 is provided in addition to support the 1-lane connection 324. However, connections to both 2-lane embedded UFS 330 and 1-lane UFS card 340 may not always be required, and so host 310 of system 300 may incur high costs due to the redundant/unnecessary combination of hardware shown to support both UFS devices 330 and 340.

With reference to FIG. 4, a conventional design for sharing some hardware for supporting a 1-lane UFS device and a 2-lane UFS device is shown. For example, system 400 comprises host 410 with HCI 412 and UTP 414 designed to support up to 2-lanes, and Unipro 416 comprising packet router 417. Packet router 417 may either route 2-lane traffic to 2-lane embedded UFS 430 or 1-lane traffic to 1-lane UFS card 440.

In more detail, packet router may 417 be designed to determine a target ID (e.g., from a command received by Unipro 416), and if the target ID indicates the 2-lane embedded UFS 430, then traffic on both lanes may be routed through the two RMMIs 418a-b to the two M-PHYs 420a-b on to 2-lane connection 422 to embedded UFS 430 (wherein embedded UFS 430 may comprise M-PHYs 432a-b, Unipro 434, and UTP 436 designed for 2-lane support as discussed in FIG. 2).

If packet router 417 determines the target ID to correspond to the 1-lane UFS card 440, then the traffic may be routed through RMMI 418c to M-PHY 420c on to 1-lane connection 424 to UFC card 440 (wherein UFS card 440 may comprise M-PHY 442, Unipro 444, and UTP 440 designed to support 1-lane, as discussed with reference to FIG. 1).

However, even with the sharing of hardware associated with HCI 412 and UTP 414 using packet router 417 in Unipro 416, it is seen that host 410 still includes separate hardware for the three M-PHYs 420a-c, similar to system 300 of FIG. 3. The physical layer, M-PHYs 420a-c (and related RMMIs 418a-c) involve a significant portion of the hardware integrated on host 410, and so hardware costs are not significantly reduced in system 400 in comparison with system 300. Furthermore, implementing packet router 417 as discussed above in Unipro 416 may be difficult or prohibitive, as significant changes are required in Unipro 416 to support such a packet router, but since Unipro networking is part of the MIPI standard (which is not yet well-defined in the art), such modifications may necessitate a change in the MIPI standard, which may not be feasible or possible to implement with efficiency.

With reference to FIG. 5, yet another conventional system 500 is shown, designed to support both 1-lane and 2-lane UFS devices. In system 500, host 510 is connected in series (referred to as a daisy-chain connection in this case), first to embedded UFS 530, and then to UFS card 540 via embedded UFS 530. In this configuration, host 510 includes HCI 512, UTP 514, Unipro 516, two RMMIs 518a-b and two M-PHYs 520a-b designed to support 1-lane and 2-lane connections, wherein host 510 is connected through 2-lane connection 522 to embedded UFS 530, and embedded UFS 530 is designed to implement routing functions for 1-lane traffic to UFS card 540.

In more detail, embedded UFS 530 includes two M-PHYs 532a-b, Unipro 534a, and UTP 536a on a first side interfacing host 510 through 2-lane connection 522; and UTP 536b, Unipro 534b, and M-PHYC 532c on a second side interfacing UFS card 540 through 1-lane connection 524, wherein UFS card 540 comprises M-PHY 542, Unipro 544, and UTP 546 designed to support 1-lane connection. Router 537 is provided between the two sides of embedded UFS 530. A target device ID is retrieved by router 537 from a command received via host 510 and if the command indicates that embedded UFS 530 is the target, then the traffic is routed to the first side; but if the target is UFS card 540, then embedded UFS 530 acts as a surrogate host and traffic is routed via the second side to UFS card 540.

As can be readily seen, embedded UFS 530 in the design of system 500 is more expensive than conventional designs discussed previously, due to the integration of the additional hardware for acting as the conduit to UFS card 540. Furthermore, in situations where only UFS card 540 is being accessed by host 510, power to embedded UFS 530 cannot be turned off since traffic to UFS card 540 is routed through embedded UFS 530. Also, the 2-lane traffic bandwidth for embedded UFS 530 is shared with 1-lane bandwidth for UFS card 540, which can reduce the effective bandwidth for both 2-lane and 1-lane traffic to the respective UFS devices.

To overcome the aforementioned drawbacks of conventional systems 100-500 of FIGS. 1-5 above, exemplary designs will now be discussed with reference to FIGS. 6 and 7A-B. In FIG. 6, an example structure of exemplary system 600 will first be outlined. In system 600, host 610 is specifically shown. Host 610 is designed to support various Universal Flash Storage (UFS) devices including 1-lane or 2-lane embedded UFS as well as removable 1-lane UFS cards. It is recognized that host 610 may generally be configured to support 2-lane embedded UFS device or a 1-lane embedded UFS device in conjunction with a 1-lane removable UFS card. These options may be provided via static programming of host 610, e.g., by use of a read only memory (ROM) setting or hardwiring/strapping.

In more detail, host 610 is shown to include a control layer such as Host Controller Interface (HCI) 612, a transport layer such as UFS Transport Protocol (UTP) 614, a link layer such as Unified Protocol layer (Unipro) 616, and two physical layer interfaces such as mobile-physical-layers (M-PHYs) 620a-b designed to support 1-lane or 2-lanes according to existing JEDEC and MIPI standards. A router such as a Reference M-PHY MODULE Interface (RMMI) router 650 is added to host 610, to route data on RMMIs 618a-b on to RMMIs 652a-b before they reach M-PHYs 620a-b. The routing is based on the previously mentioned first mode (transparent mode) or second mode (routing mode). The two modes of routing are used to support different lane configurations for UFS devices, as will be explained in further detail with reference to FIGS. 7A-B. In host 610, it is seen that M-PHYs 620a-b and related hardware are common to both modes, which reduces the hardware costs.

Figure 7A:
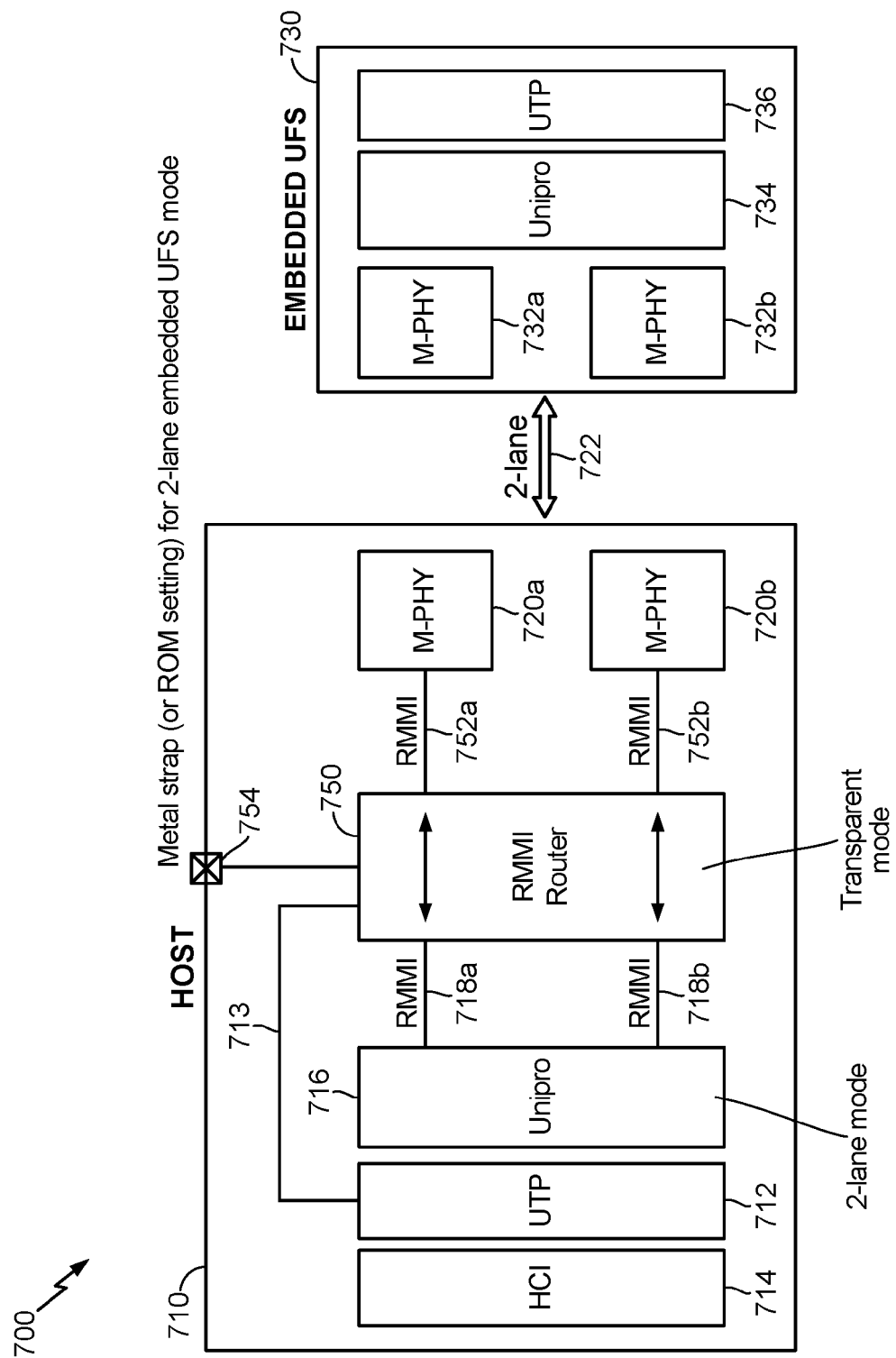
FIGS. 7A-B illustrate exemplary systems with a UFS host comprising a RMMI router configured to support interfacing the UFS host with different UFS devices with different lane requirements based on different mode settings of the RMMI router, according to aspects of this disclosure.

In FIG. 7A, exemplary system 700 configured in a transparent mode is shown. System 700 comprises host 710 coupled to embedded UFS 730. Embedded UFS 730 may be a 2-lane embedded UFS device connected to host 710 via 2-lane connection 722. Similar to host 610 of FIG. 6, host 710 also includes HCI 714, UTP 712, Unipro 716 and M-PHYs 720a-b designed according to existing standards and configured to support 2-lane traffic related to 2-lane embedded UFS 730 in the transparent mode. RMMI router 750 may be configured via metal strap 754 as shown (or alternatively, via a ROM setting in some cases) to function in the transparent mode to interface with 2-lane embedded UFS 730. In this regard, Unipro 716 provides traffic in the 2-lane mode on to two Reference M-PHY MODULE Interfaces (RMMIs) comprising first RMMI 718a and second RMMI 718bb, and RMMI router 750 passes the traffic through to RMMIs 752a-b without any rerouting applied. Correspondingly, M-PHYs 720a-b interface with 2-lane embedded UFS 730, effectively preserving the traffic pattern.

Figure 7B:
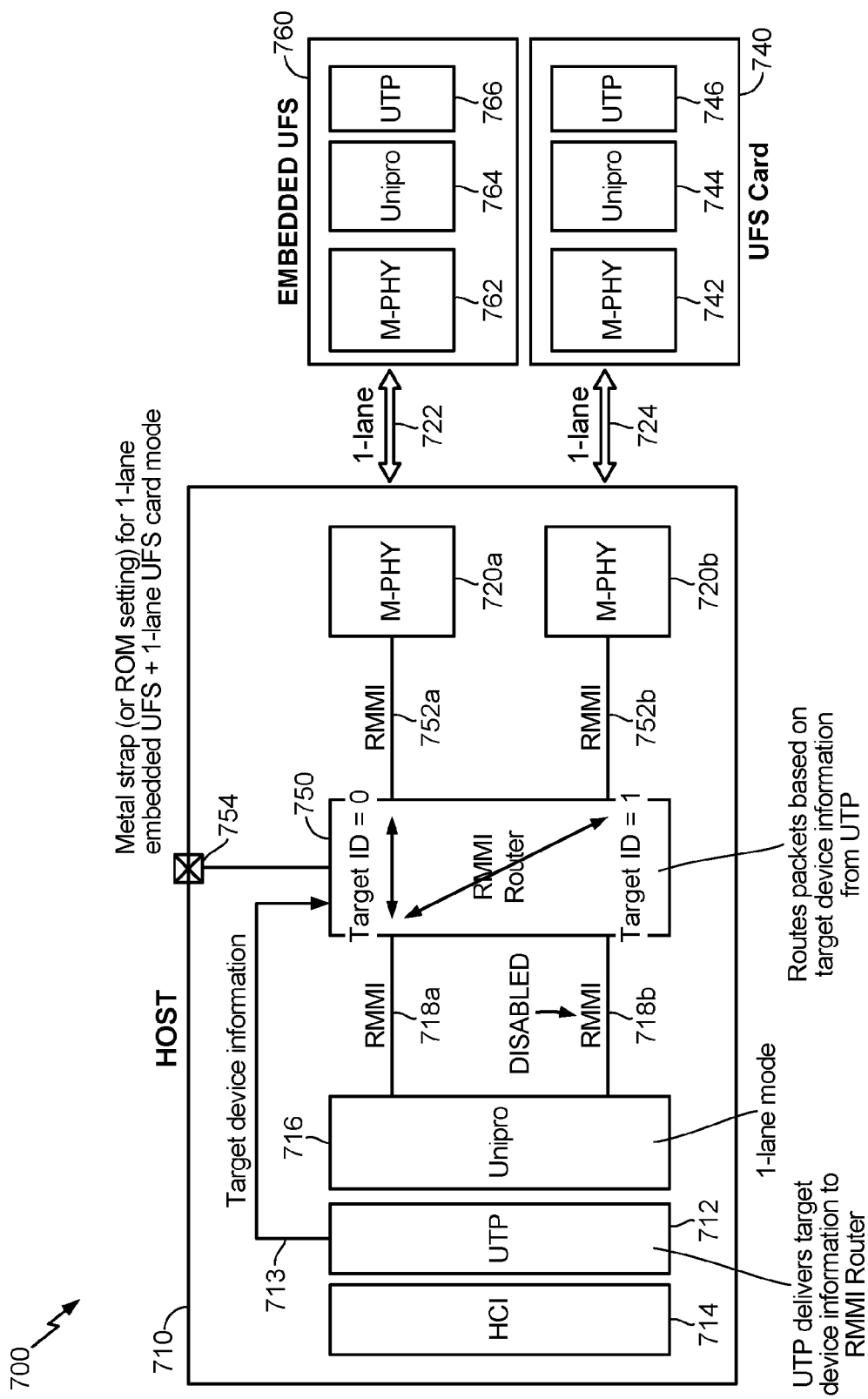

However, in FIG. 7B, system 700 configured in the routing mode is shown, where traffic may be routed by RMMI router 750 to a subset of M-PHYs 720a-b (i.e., either to M-PHY 720a or to M-PHY 720b). In FIG. 7B, host 710 may be connected to two 1-lane devices such as 1-lane embedded UFS 760, and 1-lane UFS card 740. In the implementation shown, M-PHY 720a may be associated with or configured to interface 1-lane embedded UFS 760, whereas M-PHY 720b may be associated with or configured to interface 1-lane UFS card 740. Correspondingly, RMMI router 750 may be programmed via metal strap 754 (or ROM setting) for the routing mode with the configuration of the 1-lane embedded UFS 760 and 1-lane UFS card 740 shown in FIG. 7B.

In host 710, UTP 712 keeps track of the target device ID which indicates whether traffic is directed to 1-lane embedded UFS 760 or 1-lane UFS card 740 in the routing mode. The target device ID is delivered via line 713 to RMMI router 750. Unipro 716 is set to 1-lane mode and one of the RMMIs, in this case, RMMI 718b, is disabled. Based on the target ID, RMMI router 750 routes the traffic to either M-PHY 720a through RMMI 752a (if target ID=0 to indicate 1-lane embedded UFS 760 in the illustrated example) or to M-PHY 720b through RMMI 752b (if target ID=1 to indicate 1-lane UFS card 740 in the illustrated example).

It is noted that in exemplary aspects, it may not be possible to interleave accesses to 1-lane embedded UFS 760 or 1-lane UFS card 740 in the routing mode (keeping in mind that interleaved or parallel access is also not typical in implementations of host devices interfacing with an embedded UFS device and a UFS card). Therefore, if the target device ID for a current access command is corresponds to a first target device among 1-lane embedded UFS 760 or 1-lane UFS card 740, and for the next access command, the target ID switches to correspond to a different, second target device among 1-lane embedded UFS 760 or 1-lane UFS card 740, as determined by UTP 712 which tracks the target ID, an indication is sent via line 713 to RMMI router 750 that there has been a switch or change in target ID. Correspondingly, execution of commands and flow of traffic to the new target UFS device indicated by the changed target ID is stalled until all existing/current transactions to the current target ID have been completed.

In alternative implementations, commands or accesses to the same target device ID may be grouped together or queued (e.g., in UTP 712) before a switch in target devices between 1-lane embedded UFS 760 or 1-lane UFS card 740 is effected in RMMI router 750 in the routing mode, in order to minimize the switching activity and associated costs.

Accordingly, in exemplary implementations of system 700 shown in FIGS. 7A-B, efficient utilization of hardware and logic sharing is disclosed for 2-lane embedded UFS devices in the transparent mode and routing between a 1-lane embedded UFS or 1-lane UFS card in the routing mode. It is also noted that exemplary aspects do not require any changes in hardware or designs associated with the embedded UFS devices or removable UFS cards to enable the functions in the various modes. Accordingly, exemplary configurations for host devices may be compatible with various standards-compliant UFS devices. Furthermore, although specific lane configurations have been mentioned in the description of the exemplary aspects, it will be appreciated that exemplary techniques may be extended to accommodate flexible support of UFS devices of various other lane settings.

Figure 8:
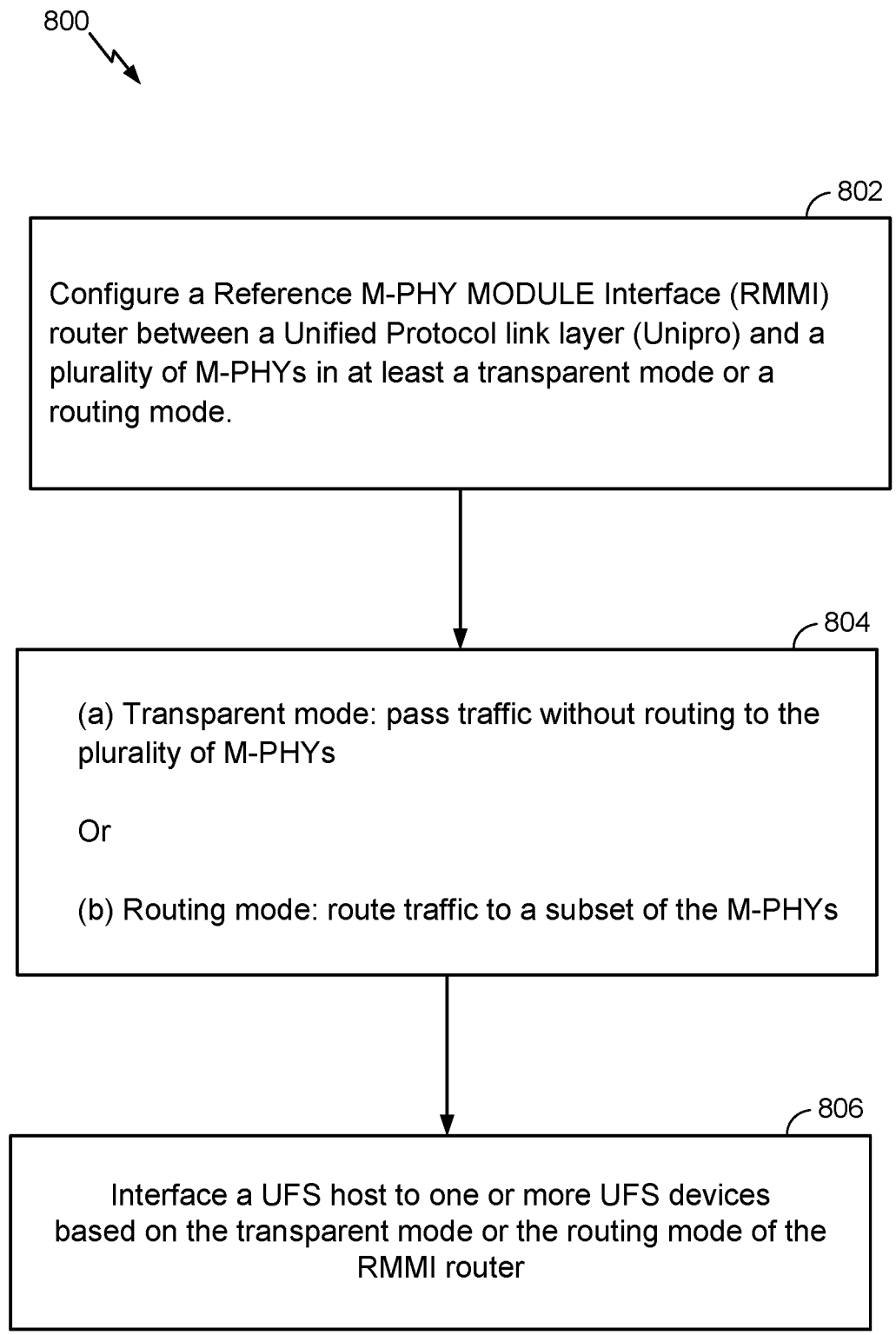
FIG. 8 illustrates a flow-chart pertaining to a method of operating a UFS host, according to exemplary aspects of this disclosure.

It will be appreciated that aspects include various methods for performing the processes, functions and/or algorithms disclosed herein. For example, FIG. 8 illustrates an exemplary method (800) of operating a Universal Flash Storage (UFS) host (e.g., host 710) according to an exemplary aspect of this disclosure.

Accordingly, Block 802 comprises configuring a Reference M-PHY MODULE Interface (RMMI) router (e.g., RMMI router 750) between a Unified Protocol link layer (e.g., Unipro 716) and a plurality of M-PHYs (e.g., M-PHYs 720a-b) in one of at least two modes comprising a transparent mode or a routing mode.

In Block 804, depending on the mode: in the transparent mode (e.g., FIG. 7A), method 800 comprises passing traffic, without routing, to the plurality of M-PHYs (e.g., to interface 2-lane embedded UFS 730). Or in Block 804, in the routing mode (e.g., FIG. 7B), method 800 comprises routing traffic to a subset of the M-PHYs (e.g., to interface 1-lane embedded UFS 760 or 1-lane removable UFS card 740).

Block 806 comprises interfacing the UFS host to one or more UFS devices based on the transparent mode or the routing mode of the RMMI router (e.g., directing traffic to the one or more M-PHYs to support either 2-lane traffic or 1-lane traffic to a UFS device indicated by a target device ID).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for managing memory accesses, including partial page memory accesses, in a processing system. Accordingly, the invention is not limited to illustrated examples and any means for performing the functionality described herein are included in aspects of the invention.

Figure 9:
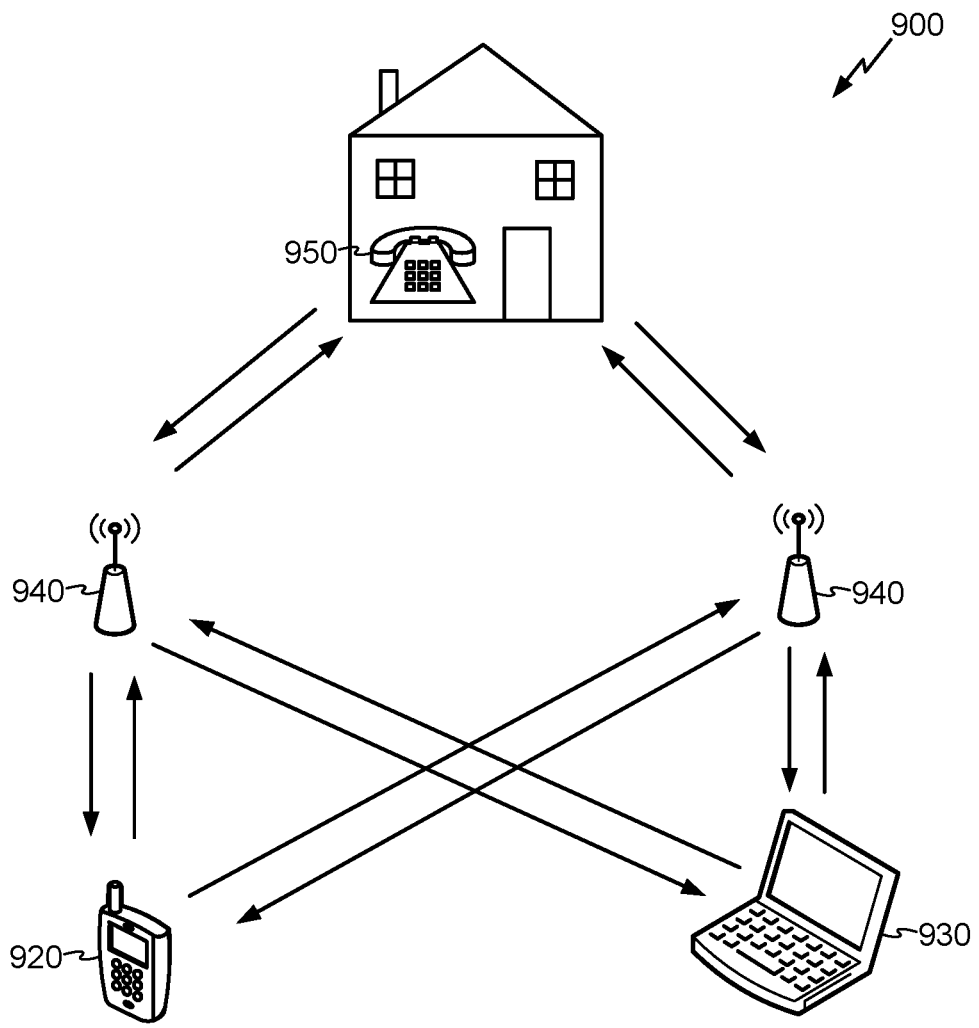
FIG. 9 is a block diagram showing an exemplary wireless communication system in which aspects of the disclosure may be advantageously employed.

FIG. 9 illustrates an exemplary wireless communication system 900 in which an aspect of the disclosure may be advantageously employed. For purposes of illustration, FIG. 9 shows three remote units 920, 930, and 950 and two base stations 940. In FIG. 9, remote unit 920 is shown as a mobile telephone, remote unit 930 is shown as a portable computer, and remote unit 950 is shown as a fixed location remote unit in a wireless local loop system. For example, the remote units may be a set top box, a music player, a video player, an entertainment unit, a navigation device, a server, a personal digital assistant (PDA), a fixed location data unit, a computer, a laptop, a tablet, a communications device, a mobile phone, or other similar devices that store or retrieve data or computer instructions, or any combination thereof. Although FIG. 9 illustrates remote units according to the teachings of the disclosure, the disclosure is not limited to these exemplary illustrated units. Aspects of the disclosure may be suitably employed in any device which includes active integrated circuitry including memory and on-chip circuitry for test and characterization.

The foregoing disclosed devices and methods are typically designed and are configured into GDSII and GERBER computer files, stored on a computer readable media. These files are in turn provided to fabrication handlers who fabricate devices based on these files. The resulting products are semiconductor wafers that are then cut into semiconductor die and packaged into a semiconductor chip. The chips are then employed in devices described above.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. An apparatus comprising:
   a Universal Flash Storage (UFS) host configured to interface one or more UFS devices, the UFS host comprising:
      a plurality of mobile-physical-layers (M-PHYs) configured to support one or more lanes of traffic between the UFS host and the one or more UFS devices; and
      a Reference M-PHY MODULE Interface (RMMI) router coupled between a Unified Protocol link layer (Unipro) and the plurality of M-PHYs,
   wherein the RMMI router is configured to support at least:
      a transparent mode, wherein traffic is passed without routing to the plurality of M-PHYs; and
      a routing mode, wherein traffic is routed to a subset of the plurality of M-PHYs.

2. The apparatus of claim 1,
   wherein the plurality of M-PHYs comprises two M-PHYs and
   wherein, in the transparent mode the RMMI router is configured to pass traffic between the UFS host and a 2-lane embedded UFS device through the two M-PHYs.

3. The apparatus of claim 1, wherein the plurality of M-PHYs comprises
   a first M-PHY configured to interface a 1-lane embedded UFS device and
   a second M-PHY configured to interface a 1-lane removable UFS card.

4. The apparatus of claim 3, wherein in the routing mode, the RMMI router is configured to route traffic to the first M-PHY or to the second M-PHY based on a target device ID provided by a UFS Transport Protocol (UTP).

5. The apparatus of claim 4, wherein the UTP is configured to group accesses to a first target device among the 1-lane embedded UFS device and the 1-lane removable UFS card.

6. The apparatus of claim 5, wherein the UTP is further configured to stall traffic to a second target device among the 1-lane embedded UFS device and the 1-lane removable UFS card before the RMMI router switches to the second target device.

7. The apparatus of claim 4, comprising two Reference M-PHY MODULE Interfaces (RMMIs) configured between the Unipro and the RMMI router, with
   a first RMMI configured to route traffic corresponding to the first M-PHY from the Unipro to the RMMI router and
   a second RMMI configured to route traffic corresponding to the second M-PHY from the Unipro to the RMMI router.

8. The apparatus of claim 7, wherein in the routing mode, one of the first RMMI or the second RMMI is disabled.

9. The apparatus of claim 1, comprising a metal strap or read only memory (ROM) setting to configure the RMMI router in the transparent mode or the routing mode.

10. The apparatus of claim 1, integrated into a device selected from the group consisting of a set top box, a music player, a video player, an entertainment unit, a navigation device, a server, a personal digital assistant (PDA), a fixed location data unit, a computer, a laptop, a tablet, a communications device, and a mobile phone.

11. A method of operating a Universal Flash Storage (UFS) host, the method comprising:
   configuring a Reference M-PHY (mobile-physical-layer) MODULE Interface (RMMI) router between a Unified Protocol link layer (Unipro) and a plurality of M-PHYs in one of at least two modes comprising:
      in a transparent mode, passing traffic without routing to the plurality of M-PHYs; and
      in a routing mode, routing traffic to a subset of the plurality of M-PHYs; and
   interfacing the UFS host to one or more UFS devices based on the transparent mode or the routing mode.

12. The method of claim 11, wherein the plurality of M-PHYs comprises two M-PHYs.

13. The method of claim 12, comprising, in the transparent mode, configuring the RMMI router to pass traffic between the UFS host and a 2-lane embedded UFS device through the two M-PHYs.

14. The method of claim 11, wherein the plurality of M-PHYs comprises
a first M-PHY configured to interface a 1-lane embedded UFS device and a
second M-PHY configured to interface a 1-lane removable UFS card.

15. The method of claim 14, comprising, in the routing mode, configuring the RMMI router to route traffic to the first M-PHY or to the second M-PHY based on a target device ID provided by a UFS Transport Protocol (UTP).

16. The method of claim 15, further comprising grouping accesses to a first target device among the 1-lane embedded UFS device and the 1-lane removable UFS card.

17. The method of claim 16, further comprising stalling traffic to a second target device among the 1-lane embedded UFS device and the 1-lane removable UFS card, before the RMMI router switches to the second target device.

18. The method of claim 15, further comprising configuring two Reference M-PHY MODULE Interfaces (RMMIs) between the Unipro and the RMMI router, with
a first RMMI for routing traffic corresponding to the first M-PHY from the Unipro to the RMMI router and
a second RMMI for routing traffic corresponding to the second M-PHY from the Unipro to the RMMI router.

19. The method of claim 18, further comprising disabling one of the first RMMI or the second RMMI in the routing mode.

20. The method of claim 11, comprising setting a metal strap or read only memory (ROM) for configuring the RMMI router in the transparent mode or the routing mode.

21. A non-transitory computer readable storage medium comprising code, which, when executed by a processor, causes the processor to operate a Universal Flash Storage (UFS) host, the non-transitory computer readable storage medium comprising:
code for configuring a Reference M-PHY (mobile-physical-layer) MODULE Interface (RMMI) router between a Unified Protocol link layer (Unipro) and a plurality of M-PHYs in one of at least two modes comprising:
code for passing traffic without routing to the plurality of M-PHYs in a transparent mode; and
code for routing traffic to a subset of the plurality of M-PHYs in a routing mode; and
code for interfacing the UFS host to one or more UFS devices based on the transparent mode or the routing mode.

22. The non-transitory computer readable storage medium of claim 21, comprising code configuring the RMMI router to pass traffic between the UFS host and a 2-lane embedded UFS device in the transparent mode, wherein the plurality of M-PHYs comprises two M-PHYs.

23. The non-transitory computer readable storage medium of claim 21, comprising, code for configuring the RMMI router to route traffic to a first M-PHY or to a second M-PHY based on a target device ID provided by a UFS Transport Protocol (UTP) in the routing mode,
wherein the plurality of M-PHYs comprises the first M-PHY configured to interface a 1-lane embedded UFS device and the second M-PHY configured to interface a 1-lane removable UFS card.

24. The non-transitory computer readable storage medium of claim 23, further comprising code for grouping accesses to a first target device among the 1-lane embedded UFS device and the 1-lane removable UFS card.

25. The non-transitory computer readable storage medium of claim 24, further comprising code for stalling traffic to a second target device among the 1-lane embedded UFS device and the 1-lane removable UFS card, before the RMMI router switches to the second target device.

26. The non-transitory computer readable storage medium of claim 23, further comprising code for configuring two Reference M-PHY MODULE Interfaces (RMMIs) between the Unipro and the RMMI router, with
a first RMMI for routing traffic corresponding to the first M-PHY from the Unipro to the RMMI router and
a second RMMI for routing traffic corresponding to the second M-PHY from the Unipro to the RMMI router.

27. The non-transitory computer readable storage medium of claim 26, further comprising code for disabling one of the first RMMI or the second RMMI in the routing mode.

28. The non-transitory computer readable storage medium of claim 21, further comprising code for setting a read only memory (ROM) for configuring the RMMI router in the transparent mode or the routing mode.

29. An apparatus comprising:
a Universal Flash Storage (UFS) host comprising:
means for configuring a Reference M-PHY (mobile-physical-layer) MODULE Interface (RMMI) router between a Unified Protocol link layer (Unipro) and a plurality of M-PHYs in one of at least two modes comprising:
means for passing traffic without routing to the plurality of M-PHYs in a transparent mode; and
means for routing traffic to a subset of the plurality of M-PHYs in a routing mode; and
means for interfacing the UFS host to one or more UFS devices based on the transparent mode or the routing mode.

30. The apparatus of claim 29, wherein the plurality of M-PHYs comprises
a first M-PHY and a second M-PHY,
means for interfacing the first M-PHY with a 1-lane embedded UFS device and
means for interfacing the second M-PHY with a 1-lane removable UFS card.

* * * * *